(No Model.)
T. WORLEY.
STAIR ROD.
No. 321,168. Patented June 30, 1885.
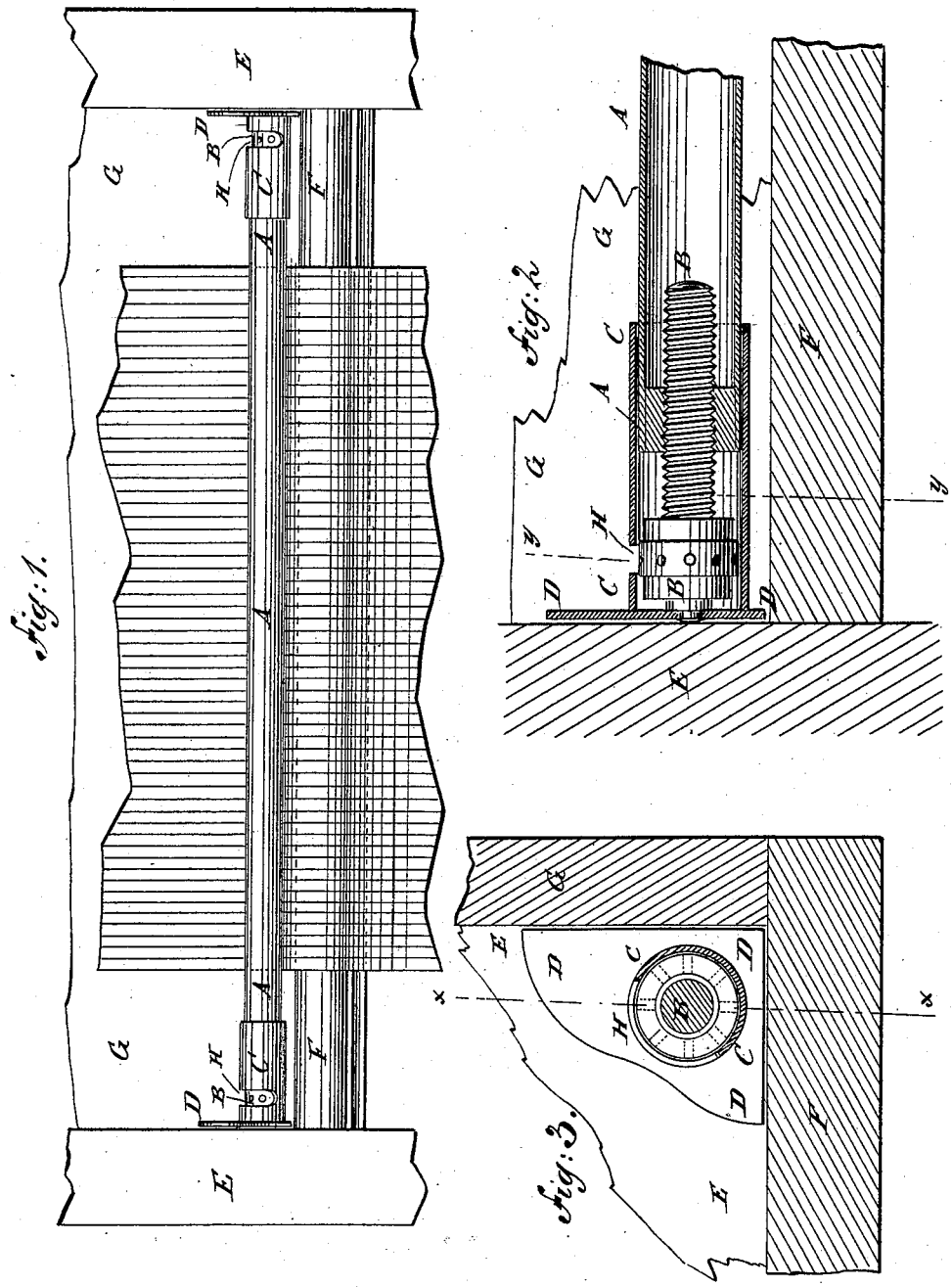
WITNESSES:
INVENTOR:
T. Worley
BY Munn & Co.
ATTORNEYS.

UNITED STATES PATENT OFFICE.

THOMAS WORLEY, OF NEW YORK, N. Y.

STAIR-ROD.

SPECIFICATION forming part of Letters Patent No. 321,168, dated June 30, 1885.

Application filed April 21, 1885. (No model.)

*To all whom it may concern:*

Be it known that I, THOMAS WORLEY, of the city, county, and State of New York, have invented a new and useful Improvement in Stair-Rods, of which the following is a full, clear, and exact description.

Reference is to be had to the accompanying drawings, forming a part of this specification, in which similar letters of reference indicate corresponding parts in all the figures.

Figure 1 is a front elevation of one of my improved stair-rods, illustrating its use. Fig. 2 is a sectional front elevation of a part of the same, enlarged, taken through the line $x$ $x$, Fig. 3. Fig. 3 is a sectional end elevation of a part of the same, taken through the line $y$ $y$, Fig. 2.

The object of this invention is to provide stair-rods designed, especially, for box-stairs, and constructed in such a manner that they can be readily applied and removed, and which will confine the carpet securely.

The invention consists in stair-rods constructed with interior screw-threads in each end, screws fitting into the said screw-threads and having radial perforations in their shanks, and caps having flanged outer ends and transverse slots, and inclosing the said screws and the ends of the rod, as will be hereinafter fully described, and then claimed.

A represents the central part of the stair-rod, which may be made tubular with a nut secured in each end, or solid with a screw-hole in each end, as may be desired. B are two screws, the threads of which fit into the interior screw-threads of the rod A. The outer parts or shanks of the screws B are enlarged, and have radial holes formed in them to receive the end of a pin to serve as a lever for turning the said screws. The outer ends of the screws B and center rod, A, are covered by tubular caps C. The outer ends of the caps C have flanges D formed upon or attached to them, to rest against the side boards, E, of the stairs. Each flange D has a right angle formed upon one part of its edge, to fit into the angle between the step F and riser G of the stairs, as shown in Fig. 3, and hold the cap C from turning. The outer end of each screw B has a point or round tenon formed upon it to enter a hole in the end of the cap C and center the screw in the said cap.

In the side of each cap C is formed a transverse slot, H, in such a position as to be directly over the radial holes in the screw B, to allow a lever-pin to be inserted in the said holes, and operated to turn the said screw.

The perforated parts of the screws B should be of such a size as to fit snugly into the caps C, to prevent dust from entering the said caps around the said screws.

In using my improved stair-rods the screws B are inserted in the screw holes in the ends of the center rods, A, and are screwed in, and the caps C are placed upon the ends of the rods. The rods are then placed in the angles between the steps F and risers G, and the screws B are turned out until the flanged ends of the caps C are pressed so firmly against the side boards, E that the said rods will be firmly secured in place and held against the strain of the stair-carpet.

Having thus fully described my invention, I claim as new and desire to secure by Letters Patent—

1. In a stair-rod, the combination, with the center rod, A, having interior screw-threads at its ends, of the screws B, having radial perforations in their shanks to receive a lever-pin for operating them, substantially as herein shown and described, whereby the said stair-rod can be secured in place by turning the said screws out against the side boards of the stairs, as set forth.

2. In a stair-rod, the combination, with the center rod, A, having screw-threads at its ends, and the end screws, B, having radial perforations in their shanks, of the caps C, having flanged outer ends, and provided with transverse slots to give access to the radial perforations of the said screws, substantially as herein shown and described, whereby the said screws will be covered, as set forth.

THOMAS WORLEY.

Witnesses:
JAMES T. GRAHAM,
EDGAR TATE.